March 18, 1952 — G. E. SPRAGUE — 2,589,887
YIELDABLE CHAIN LINK
Filed July 31, 1947

Guy E. Sprague
INVENTOR
BY
ATTORNEYS.

Patented Mar. 18, 1952

2,589,887

UNITED STATES PATENT OFFICE 2,589,887

YIELDABLE CHAIN LINK

Guy Elsworth Sprague, Rochester, Ind.

Application July 31, 1947, Serial No. 764,947

1 Claim. (Cl. 74—245)

This invention relates to chain links, and more particularly, has reference to an improved link construction for heavy conveyor chains, such as are used in large industrial plants, whereby when the chain is not under a pulling load, the slack ordinarily present therein may be reduced to a minimum.

The primary object of the invention is to provide a chain link construction which is adapted for use on heavy chains of great length, in which, when a pull is not being exerted upon the chain, considerable slack customarily occurs. When such slack occurs, it is common in chains of conventional construction that the chain will not run uniformly, and will wear at a relatively rapid rate. In the invention, however, a slack occurs, it is taken up automatically, thus holding the chain in place and preventing wear.

Briefly, the invention comprises a link construction whereby the strain on the chain is assumed wholly by the connected links when the chain is pulling or is under load during conveying operations. Means are embodied in association with the link construction, however, which automatically take up slack when the pull is relaxed, or the chain is not under load. This take-up means comprises a spring arrangement novelly disposed relative to the links, and connected thereto, which acts upon the links in an unusually effective and simple manner to take up the slack in the chain.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawings.

Figure 1:
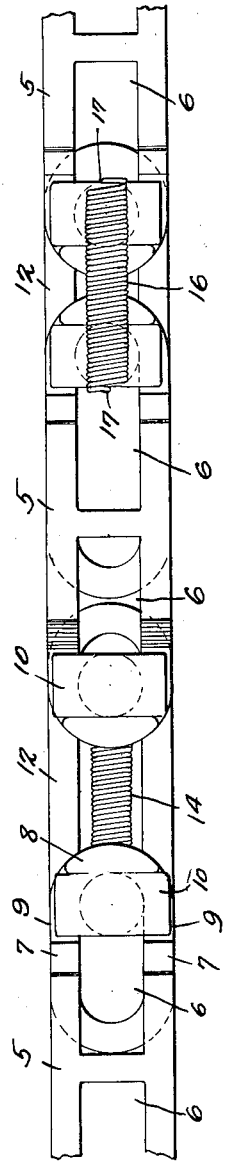
Figure 1 is a side elevational view of a portion of a chain embodying my construction.
Figure 2:
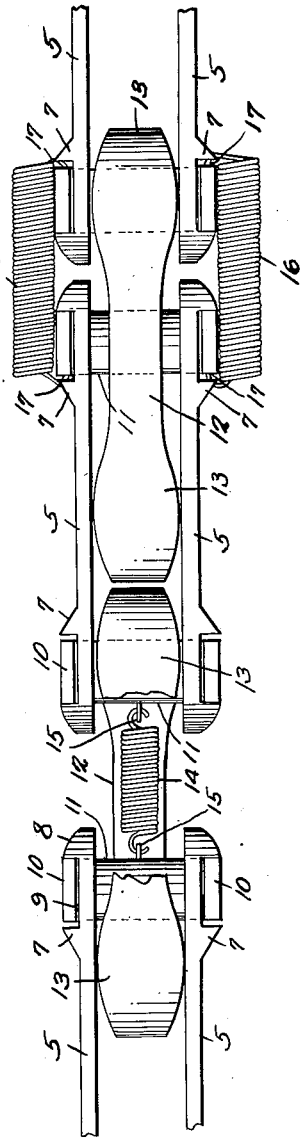
Figure 2 is a top plan view, a portion of one link being broken away to show details of part of the spring arrangement.

Referring to the drawings in detail, 5 designates opposed side walls of flat and suitably elongated formation, which, as best shown in Figure 2, are arranged in spaced apart pairs. Each side wall 5 is formed with longitudinally disposed end openings 6, that are preferably of substantially rectangular conformation. Adjacent the opposed ends of each side wall 5, transverse shoulders 7 are integrally provided on the outer surfaces thereof, and the ends of the respective side walls are outwardly enlarged, as at 8, to provide transversely disposed end abutments.

As a result of this formation, and referring particularly to Figure 2, it is seen that at the opposite ends of each side wall 5, recesses 9 are formed on the outer surfaces thereof, these loosely receiving rectangular heads 10 on pins 11 that extend between the ends of the side walls 5 of each pair. To remove the pins 11, it is necessary only to bring the opposed side walls towards each other, whereby the heads 10 of the pin are freed, and may be passed through the openings 6 of the side walls.

During normal operation of the chain, however, the side walls 5 cannot be brought together, and the heads 10 are retained at all times in the recesses 9. This is due to the construction of closed connecting links 12, the ends of which are enlarged as at 13, to hold the side walls 5 apart.

A tightly coiled compression spring 14 extends between selected adjacent pins 11, this being connected at its ends to said pins by means of cotter pins 15, or by any other suitable fastener. Pairs of similarly tightly coiled compression springs 16 connect other selected adjacent links, these being disposed exteriorly of the chain, at opposite sides thereof, and being connected as at 17 to the heads of adjacent pins 11.

In the art, heavy conveyor chains may often be of great length, and when not pulling, chains of such great length customarily throw off considerable slack. This prevents uniform running of the chain, and additionally, results in an unusual amount of wear thereon. By reason of the construction of a chain in accordance with the invention, however, it will be seen that whenever slack begins to occur, springs 14 and 16 respectively, tending to compress, will retain the adjacent pins 11 to which they are respectively connected in a close relation, thus preventing slack from occurring on the chain. Preferably, the spring arrangement is alternately provided, as illustrated in the fragment of the chain shown in the drawings, that is, a spring 14 extends between one pair of adjacent links, springs 16 connect the next pair of adjacent links, and so on.

Discussing this arrangement further, the double spring arrangement provided by the exteriorly disposed springs 16 provides a maximum of compressibility at the various points at which the double spring arrangement is provided during the length of the chain. The single spring arrangement 14, which is preferably alternately disposed to the double arrangement, provides a sufficient amount of compressibility, and yet permits sufficient flexibility of operation during the running of the chain. However, either type of spring arrangement could obviously be dispensed with in special situations, according to the needs of the situation.

With further reference to the operation, as pull is exerted upon the chain, the links will spread, until the pins 11 bear against the opposed ends of the closed links 12. As will be seen, this will cause the respective springs 14 and 16 to expand to a certain extent, but not to an extent where any of the pulling strain is imposed upon the springs, rather than the links.

Additionally, an important characteristic of the invention is that the cooperating link and spring arrangement illustrated and described permits full flexibility of the chain without, however, flexing of the respective springs out of their axes. As a result, the life of the springs will be effectively prolonged, with their normal compressibility continuing undiminished.

What is claimed is:

In a chain construction separable links each comprising spaced side walls, each side wall being formed with a pair of openings; end pins extended transversely between the side walls and through the openings; an integrally formed oblong closed link extending around the pins of adjacent separable links and having a single elongated opening receiving both of said adjacent pins; and coil springs disposed wholly within said oblong links in the space between said adjacent pins and having their ends pivotally connected to the pins, said coil springs being so proportioned as to length, when not under tension, as to retain the pins at a distance apart substantially less than the length of the elongated opening thus to space one at least of the pins inwardly from an end of the elongated opening and thereby reduce the length of the linking connection between the first-named links.

GUY ELSWORTH SPRAGUE.

REFERENCES CITED

The following references are of record in the file of this patent:

UNITED STATES PATENTS

| Number | Name | Date |
| --- | --- | --- |
| 75,814 | Turner | Mar. 24, 1868 |
| 870,704 | Weston | Nov. 12, 1907 |
| 1,090,380 | Brampton et al. | Mar. 17, 1914 |

FOREIGN PATENTS

| Number | Country | Date |
| --- | --- | --- |
| 23,067 | Great Britain | Oct. 8, 1897 |